United States Patent [19]

Young

[11] 4,155,505

[45] May 22, 1979

[54] SPACE HEATER UTILIZING SOURCE OF WASTE HEAT

[76] Inventor: Donavin G. Young, P.O. Box 181, Kent, Ohio 44240

[21] Appl. No.: 824,610

[22] Filed: Aug. 15, 1977

[51] Int. Cl.² .......................... G05D 23/00; F24B 7/00
[52] U.S. Cl. ............................. 237/2 B; 165/DIG. 2; 237/55
[58] Field of Search ............... 122/20 B; 165/DIG. 2; 237/2 B, 54, 55

[56] References Cited

U.S. PATENT DOCUMENTS

| | | | |
|---|---|---|---|
| 2,468,909 | 5/1949 | Yeager et al. | 237/55 X |
| 2,481,480 | 9/1949 | Main | 122/20 B X |
| 3,916,991 | 11/1975 | Trump | 122/20 B X |
| 3,952,947 | 4/1976 | Saunders | 126/270 X |

FOREIGN PATENT DOCUMENTS

| | | | |
|---|---|---|---|
| 1170516 | 9/1958 | France | 237/55 |
| 2256380 | 7/1975 | France | 237/2 B |
| 2257875 | 8/1975 | France | 122/20 B |
| 563986 | 6/1957 | Italy | 237/55 |
| 1041223 | 9/1966 | United Kingdom | 237/55 |

OTHER PUBLICATIONS

*Popular Mechanics,* "How to Get More of the Heat You're Paying for", pp. 152–153, Oct. 1974.
*Heating & Ventilating Review,* "Making the Best Use of Our Fuel Resources", Feb. 1976.

*Primary Examiner*—Lawrence J. Staab
*Attorney, Agent, or Firm*—Young & Thompson

[57] ABSTRACT

A space heater utilizes a source of waste heat such as hot gas passing through a metal conduit. A portion of the length of the metal conduit is surrounded by a sealed insulated enclosure. Within the enclosure, the metal tube is exposed and has heat exchange fins thereon. A circulating fan in the enclosure blows the air in the enclosure across the cold end of a closed circuit expansion-compression refrigeration system whose hot end is outside the enclosure. A fan blows air across the hot end of the refrigeration system to heat the ambient space.

1 Claim, 1 Drawing Figure

U.S. Patent
May 22, 1979
4,155,505
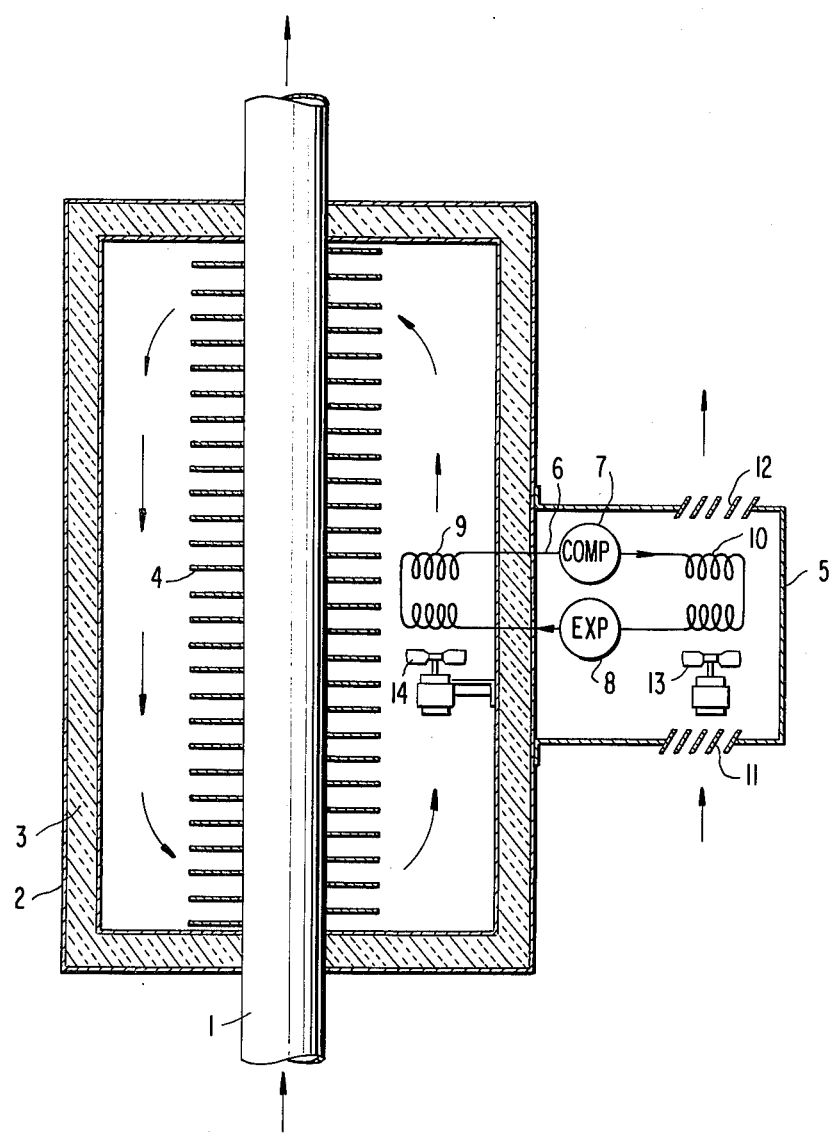

SPACE HEATER UTILIZING SOURCE OF WASTE HEAT

The present invention relates to a space heater utilizing a source of waste heat, such as hot air or other gas passing through a metal tube from industrial processing equipment or ovens or other source of hot gas which may or may not be polluted by processing procedures or which for any other reason must be exhausted.

It is of course well known that a hot fluid passing through a pipe in a plant or factory or other building, will lose a great deal of its heat to the ambient air by convective or radiative heat exchange. However, for the safety of the occupants of the ambient space, such pipes must often be insulated and so cannot serve as a space heater for their surroundings.

It would of course be possible to provide a jacket about such pipes for protection of persons in the vicinity, and then to blow air over the pipes to heat the air. However, the space within the jacket may become contaminated with dirt and dust and the heat exchange characteristics of the pipe within the jacket thus becomes greatly diminished.

It is an object of the present invention to overcome the above difficulties and disadvantages, by providing a space heater that utilizes a source of waste heat, and which is not dangerous to persons in the vicinity.

Another object of the present invention is to provide such a space heater, in which the heat exchange surfaces are not subject to fouling.

Still another object of the present invention is the provision of such a heater, in which the quantity of heat discharged to the ambient may be precisely controlled.

It is also an object of the present invention to provide such a heater, in which the temperature of the fluid from which the waste heat is derived, is reduced sharply over a relatively short distance traversed by that fluid.

Briefly, the objects of the present invention are achieved, by providing a space heater in which the hot fluid whose heat would otherwise be wasted, is conducted through a metal tube provided with fin type heat exchange projections on at least its outer surface, the finned portion of the tube being enclosed in a sealed insulated enclosure. The air in that enclosure is circulated by a fan past the cold end of a closed cycle expansion-compression refrigeration system, whose hot end is used to heat the ambient, a fan circulating the air of the ambient over the hot end of the refrigeration system for this purpose. The sealed insulated enclosure keeps the finned tube free from contamination. The provision of the cold end of a closed cycle expansion-compression refrigeration system within the enclosure, with forced air circulation over it and around the fins, maintains a desirably great temperature differential between the fins and the cold end of the refrigeration system that indirectly receives their heat. The provision of an expansion-compression type refrigeration system insures that the heat discharged to the ambient by the hot end of that system will be precisely controllable in quantity and at a temperature level which will not endanger persons in the vicinity.

Stated another way, the present invention takes maximum advantage of the classic heat exchange equation $$Q = UA\Delta T$$

According to the present invention, Q, the quantity of transferred heat, is at a maximum, because all of the factors on the right-hand side of the equation are at optimum levels. U, the coefficient of heat transfer, is maintained at its highest value because the fins of the tube in which the fluid with waste heat flows, are kept free from pollution, thanks to the sealed insulated enclosure that surrounds them. A, the total area, is maintained at its highest value by providing the fins on the tubing. $\Delta T$, the temperature differential, which can be taken for example to be the temperature difference between the fins and the cold end of the refrigeration system, is maintained at a desirably large and controllable value, by use of a closed cycle expansion-compression type refrigeration system.

Of course, the temperature profile of the system of the present invention, from the fluid flowing in the tube and whose waste heat is to be partially recovered, to the ambient air warmed by the system of the present invention, is anything but ideal. The system of the present invention, therefore, for this and other reasons, including the multiple heat exchanges involved, is admittedly highly inefficient. Nevertheless, considering that the heat from the waste heat source is free, the present invention is useful whenever the heat emitted from the space heater to the ambient is of greater value than the energy consumed to operate the refrigeration system and its associated fans. Thus, the present invention provides, for example, a safe and inexpensive way of heating industrial plants and the like during cold weather.

Other objects, features and advantages of the present invention will become apparent from a consideration of the following description, taken in connection with the accompanying drawing, which is a highly schematic view of a space heater according to the present invention, with the parts in cross section.

In the drawing, the pipe or tube 1 through which the fluid with waste heat flows, for example air at high temperature, is encased over a portion of its length by sealed enclosure 2. Enclosure 2 is insulated by insulating material 3, so that the outside of enclosure 2 can safely be exposed to persons in the vicinity, no matter how hot is the interior of the enclosure.

Tube 1 within enclosure 2 is provided with a number of heat exchange fins 4, which may for example be of helical configuration, and of metal and bonded to tube 1 in good heat exchange relationship as by soldering or the like, thereby to increase the effective heat exchange area of tube 1.

A housing 5 is secured to the outer side of enclosure 2, to contain a portion of a closed cycle expansion-compression type refrigeration system 6, whose working fluid may for example be Freon or ammonia, which is compressed in a compressor 7 and expanded through a valve or orifice 8 in a known manner. The cold end of the refrigeration system 6 is indicated by a plurality of coils 9 disposed within enclosure 2. The hot end of the refrigeration system is characterized by a number of coils 10 disposed within housing 5. Ambient air from the space to be heated, enters housing 5 through vents 11 and leaves through vents 12, under the influence of a power-driven fan 13 within housing 5, thereby to pass over and be heated by the coils 10 and to be discharged in heated condition to the ambient.

Similarly, within enclosure 2, the air is recirculated with substantially no addition thereto or subtraction therefrom, past the cooling coils 9 by a power-driven fan 14 mounted on the inside of enclosure 2, whereby the cooled air moves over fins 4 thereby to become heated by indirect heat exchange with the hot fluid in tube 1, before being continuously recycled by fan 14 past the cooling coils 9.

The fact that the air within enclosure 2 does not change, maintains the interior of enclosure 2 free from contamination, and therefore, the fins 4 remain clean and their coefficient of heat transfer relative to the circulating air, remains desirably high. The fins themselves greatly increase the area of heat exchange; while the cooling coils disposed within enclosure 2 not only maintain a desirably high temperature differential relative to the hot fluid which is the source of waste heat, but also, because they are part of an expansion-compression closed cycle refrigeration system, permit the control of that temperature differential and hence the quantity and temperature level of the heat which is discharged to the ambient in the air leaving housing 5 through vents 12.

In view of the foregoing disclosure, therefore, it will be evident that all of the initially recited objects of the present invention have been achieved.

Although the present invention has been described and illustrated in connection with a preferred embodiment, it is to be understood that modifications and variations may be resorted to, without departing from the spirit of this invention, as those skilled in this art will readily understand.

Such modifications and variations are considered to be within the purview and scope of the present invention as defined by the appended claims.

I claim:

1. A space heater that utilizes a source of waste heat, comprising a metal tube through which flows a fluid having said waste heat, a sealed enclosure surrounding said tube, the side walls of said enclosure being spaced from said tube to define a sealed space between said tube and said enclosure, said tube sealing the interior of the tube from said sealed space, fins on the outside of said tube within said enclosure to increase the area from which heat is given up by said tube to the space within said enclosure, a closed cycle heat exchanger in which a heat exchange fluid flows in a closed circuit, a portion of said heat exchanger being disposed within said enclosure to receive heat from said tube, another portion of said heat exchanger being disposed outside said enclosure to heat the ambient, said closed cycle heat exchanger comprising an expansion-compression type refrigeration system having a cold end and a hot end, said cold end being disposed within said enclosure and said hot end being disposed outside said enclosure, and fans inside and outside said enclosure for circulating air over said portions of said heat exchanger, the fan inside said enclosure circulating the same air continuously over the cold end of the heat exchanger and said fins.

* * * * *